June 19, 1962 W. HOBBS, JR 3,039,607
GRAIN BIN AND CLEANER
Filed April 12, 1960 3 Sheets-Sheet 1
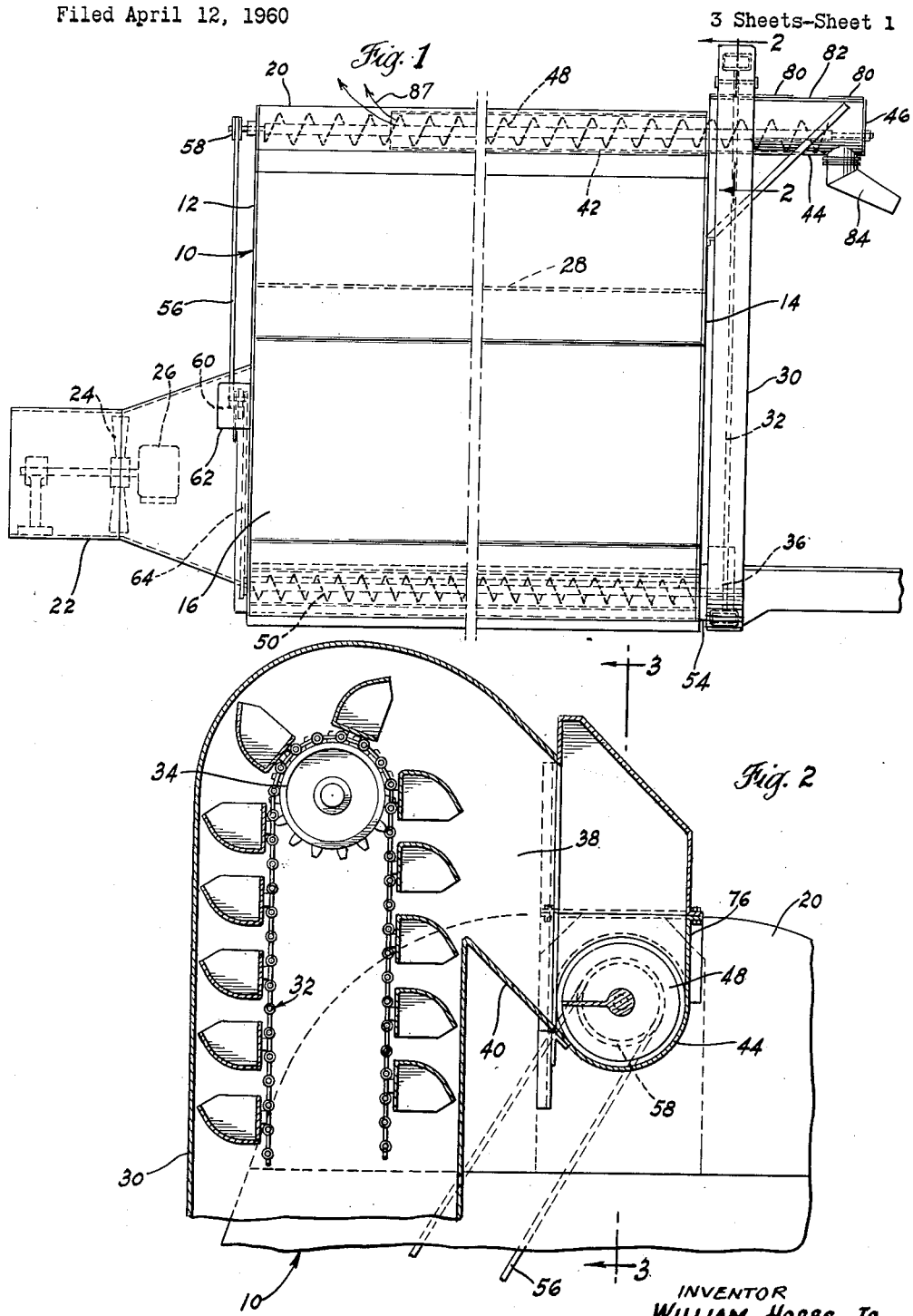
INVENTOR
WILLIAM HOBBS, JR.
BY
ATTORNEY June 19, 1962

W. HOBBS, JR 3,039,607

GRAIN BIN AND CLEANER

Filed April 12, 1960

INVENTOR
WILLIAM HOBBS, JR.

By

ATTORNEY

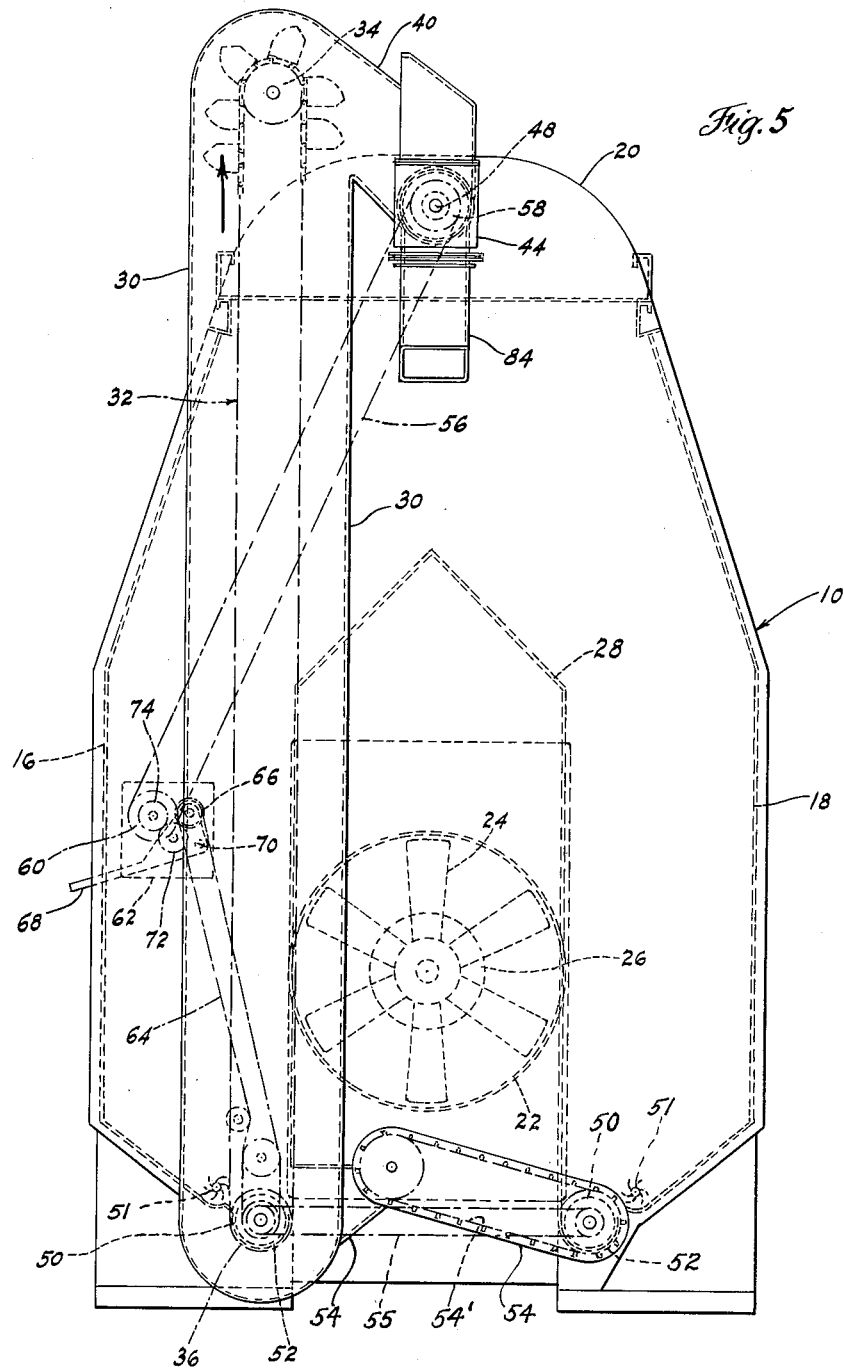

United States Patent Office 3,039,607
Patented June 19, 1962

3,039,607
GRAIN BIN AND CLEANER
William Hobbs, Jr., Lancaster, Pa., assignor to Sperry Rand Corporation, New Holland, Pa., a corporation of Delaware
Filed Apr. 12, 1960, Ser. No. 21,664
14 Claims. (Cl. 209—133)

This invention relates to improvements in a grain cleaner and, more particularly, a grain cleaner which, in the preferred embodiment of the invention, is combined with a grain bin and the grain elevating and conducting mechanism thereof.

Grain bins have been devised heretofore provided with grain elevators adjacent one end thereof, for example, but said elevators primarily having been for a single purpose, namely, either to deliver the elevated grain to the upper portion of the grain bin or to a truck or other conveying means, as desired. A swiveled spout was associated with the upper end of the elevator, which spout was moved so as to be directed either toward the upper portion of the bin or toward a truck or conveyance positioned adjacent the elevator.

Good farming practices also, preferably, contemplate the storage of cleaned grain, as distinguished from grain in the condition in which it is received from the thresher, for example, containing dirt, chaff, and other foreign matter. To this end, it has been customary to subject threshed grain to various kinds of cleaning processes employing a separate cleaning machine designed for the single purpose of cleaning grain, and the like, this operation being performed prior to the grain being conducted to a grain storage bin, regardless of whether the bin was of a stationary or portable type.

Grain bins also have been provided with drying means of various types, certain of these types comprising air-current generating means adjacent one end of the bin, such as power-driven fans of large capacity, the discharge from said fans being directed to the interior of the grain bin in order that the air might circulate as freely as possible through grain contained in the bin, this circulation being continued until a desired amount of moisture had been removed from the stored grain. Under such circumstances, the grain storage bin actually serves not only as a reservoir for grain being dried but also circulative means to expedite drying and also prevent charring of at least certain kinds of grains. It is not uncommon to completely circulate the grain through the bin a number of times. After the grain has been dried a desired or sufficient extent, the grain usually is removed to other storage means in order that additional grain might be introduced into the bin for drying thereof.

It is the principal object of the present invention to utilize the basic structure of a grain bin and elevator therefor and, by including relatively simple additions and supplementary mechanism thereto, utilize the resulting structure to clean grain while being elevated, without additional cost in operation or supplementary handling of the grain in any way.

It is another object of the invention to add to a grain bin and elevator structure having horizontal conveying means at the upper portion thereof to deliver grain to the bin, an extension projecting outwardly from said upper grain conveyor means which communicates with the elevator, and further provide selectively reversible drive means for a preferably auger type conductor of said grain conveying means, whereby when the grain is delivered by the elevator to a level adjacent or above the upper portion of the grain bin, said grain conducting means can be operated selectively either to direct the grain from the elevator into the upper portion of the bin or into the outwardly projecting extension of said conveying means for delivery to a truck or other conveying means, or the like, depending solely upon the direction of rotation of the auger-type conductor in said conveying means.

It is a further object of the invention to drive the auger-type conductor of the conveying means in the upper portion of the grain bin and the projection therefrom by a feed auger in the lower portion of the grain bin and, in the preferred embodiment of the invention, the driving connection between said augers includes direction-reversing means selectively to rotate the auger-type conductor of the upper conveying means in either direction of rotation for the purposes stated hereinabove.

Still another object of the invention is to utilize the substantially vertical elevator as an air conduit having an exit adjacent the upper end of the elevator, whereby as the exemplary buckets of the elevator dump the grain therefrom adjacent the top of the elevator, said grain actually will be thrown through space and thereby dispersed while being subjected to the column of air discharging from the upper end of the elevator so that said air may entrain foreign matter in said grain and remove it therefrom.

A still further object of the invention ancillary to the immediately foregoing object is to provide air exhaust means at preferably variably locatable positions along the horizontally extending grain conveying means at the upper portion of the grain bin, whereby foreign matter, such as dirt, chaff, and the like, may be blown through said discharge opening in said conveying means, while the grain falls to the lower portion of said conveying means and is moved by the rotating auger-type conductor therein, in cleaned condition, to the grain bin for storage therein or drying operations, as desired.

Still another object of the invention is to provide means associated with a grain bin and elevator thereon which is capable of cleaning grain either while it is being loaded into, or unloaded from, said grain bin.

Details of the foregoing objects and of the invention, as well as other objects thereof, are set forth in the following specification and illustrated in the accompanying drawings comprising a part thereof.

In the drawings:

FIG. 1 is a side elevation of an exemplary grain bin and elevator embodying the principles of the present invention.

FIG. 2 is an enlarged fragmentary vertical sectional elevation taken on the line 2—2 of FIG. 1 for purposes of illustrating certain details of the invention.

FIG. 5 is a vertical end view of the grain bin and elevator as seen in FIG. 1 but employing a larger scale than used in FIG. 1, said view being from the right-hand end of the bin and elevator shown in FIG. 1.

Figure 3:
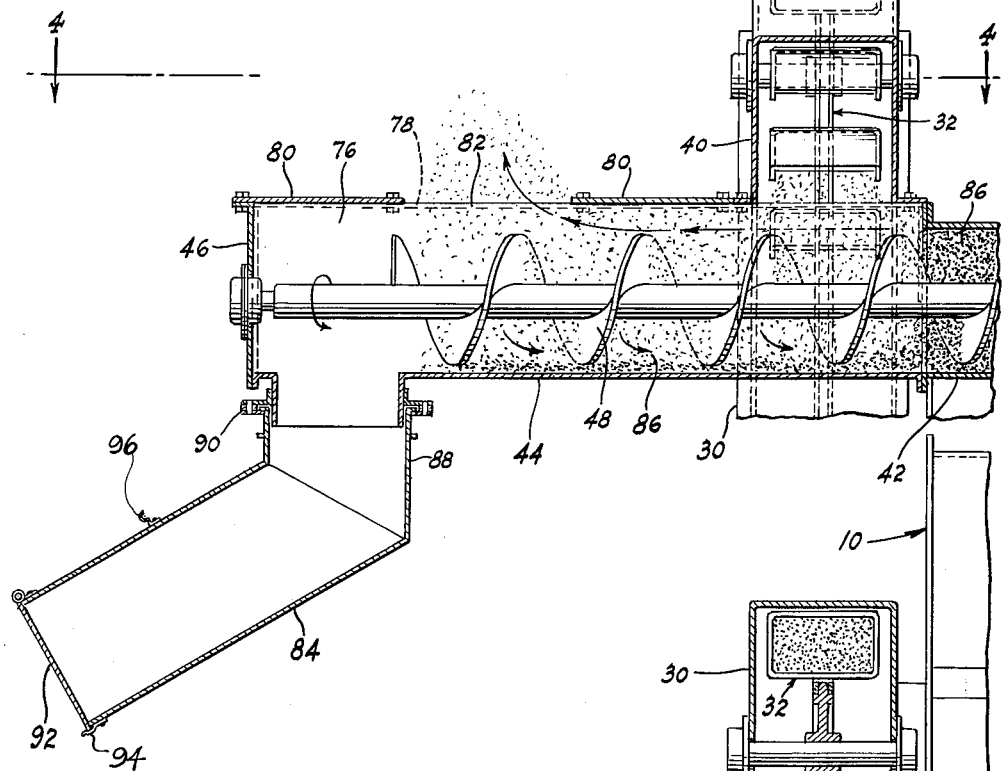
FIG. 3 is a vertical, longitudinal fragmentary elevation as seen on the line 3—3 of FIG. 2.

Referring to FIG. 1 particularly, it will be seen that the grain bin 10 has substantially vertical ends 12 and 14, the bin being broken along vertical lines intermediately of the ends thereof in order to foreshorten the view. At least the lower portions of the vertical sides 16 and 18 thereof are, preferably, substantially parallel and the upper portions of said sides slope inwardly toward each other at the top, as is apparent from FIG. 5. The upper ends of the inwardly sloping side plates 16 and 18 are spaced to provide a top opening 20 for the grain bin 10. The grain bin 10 may be either arranged for stationary positioning or to have suitable conventional wheels mounted thereon to render the same portable.

As will be seen from FIGS. 1 and 5 particularly, the grain bin 10 shown herein is of the type having an air-type grain-drying unit 22 affixed to and communicating with one end of at least the lower, central portion of the grain bin 10, the unit 22 employing a fan 24 driven by any suitable power means 26. By reference to FIG. 5, it will be seen that an air chamber 28 is arranged on the interior and longitudinally of the grain bin 10 to receive air under pressure from the unit 22, said chamber dividing at least the lower portion of the bin 10 into two parallel compartments. The walls of the air chamber 28 are suitably perforated, as are at least certain portions of the upper portions of the side walls 16 and 18 on the exterior of the grain bin 10, whereby air under pressure from the unit 22 will circulate relatively freely and uniformly, generally laterally, from the walls of chamber 28, through the grain, and out through the upper perforated portions of walls 16 and 18.

At the opposite end of the bin 10 from the unit 22 is a substantially vertical grain elevator housing 30 which contains elevating means specifically comprising, in the preferred embodiment, an endless, flexible bucket conveyor 32 which passes around suitable sprockets 34 and 36 for support and direction of movement. The upper end of the elevator housing 30 preferably extends somewhat above the top 20 and said housing has an opening 38 formed by a short, diagonally downwardly extending closed chute 40 which discharges into a substantially horizontal, preferably tubular, channel 42 which extends into and along the upper portion of the grain bin 10, terminating in substantially spaced relationship to the end 12 of said bin. The tubular channel 42 has discharge openings spaced longitudinally therealong and comprises conveyor means which has an axially outwardly extending portion or extension 44 for purposes to be described, it being understood that the extension 44 is preferably continuous in an axial direction with the tubular channel 42 and the two commonly communicate with the closed chute 40 extending from the grain elevator 30.

Supported, preferably, within suitable bearings at the end 12 of the bin 10 and the outer end 46 of extension 44 is a movable grain conductor 48 comprising, in the preferred embodiment of the invention, a rotatable feed auger of conventional type. Said conductor auger 48 is reversibly rotatable within its bearings at opposite ends thereof and is coaxially mounted within the tubular channel 42 and extension 44 thereof.

Also extending substantially in parallel relationship to the upper auger conductor 48, but rotatably mounted respectively in the two parallel lower portions of the bin 10, is a pair of feed augers 50, at least one of which is driven rotatably by any suitable means, such as an auxiliary motor or engine, not shown, or by a p.t.o. (power takeoff) of a tractor or other suitable power source, whichever is most convenient or available, the same not being illustrated. Small rotary agitators 51 also may be mounted in the lower portions of bin 10 and driven by any suitable means. The feed augers 50, as seen from FIG. 5 particularly, operate, preferably, in horizontally extending, semi-cylindrical depressions 52 so as to be capable of finally moving all of the grain from the bottoms of the parallel lower portions of the bin 10 to and through suitable combining means, such as interconnecting conduit 54, see FIGS. 1 and 5, for delivery into the bottom of elevator housing 30 in order that the buckets of the conveyor 32 may engage the grain to elevate it for discharge into the tubular channel 42 adjacent the upper end of the elevator. The feed augers 50 preferably are interconnected at one end by drive belt or chain 55. Also, movably mounted within conduit 54 is a flexible impeller member 54' which passes around suitable rotatable guide and support members, one of which is driven by the right hand feed auger 50, as seen in FIG. 5.

The conductor auger 48 preferably is driven from the feed auger 50 by drive means including mechanism capable of effecting reversal of direction of rotation of the conductor auger 48 relative to the feed auger 50, it being understood that, in the preferred embodiment of the invention, the feed auger 50 is driven uni-directionally only. An exemplary illustration of the drive mechanism is shown in FIGS. 1 and 5 and comprises endless flexible means 56, such as a belt or sprocket chain, passing around drive means 58, on one end of the shaft of conductor auger 48, and driven means 60 comprising part of drive-changing unit 62 which, for convenience, may be mounted upon the end 12 of the grain bin 10 for support thereby. Additional flexible endless driving means 64 extend around a suitable sprocket or pulley on the end of the shaft of feed auger 50 opposite that end which drives sprocket 36 and also around a driving member 66 within the drive-changing unit 62, as best shown in FIG. 5.

A manually movable shifting lever 68 is pivoted at 70 within the unit 62 and rotatably supports the driving member 66. The member 66 drives an idler-type driving member 72 which is rotatably supported also on the shifting lever 68. Upon shifting the lever 68 between its two extreme positions, either the driving member 66, or the idler-type driving member 72, selectively are brought into engagement with driven member 74 which is fixed relative to the driven means 60 by which the flexible means 56 and, correspondingly, conductor auger 48 is rotated selectively in opposite directions, depending upon the position of the shifting lever 68.

Figure 4:
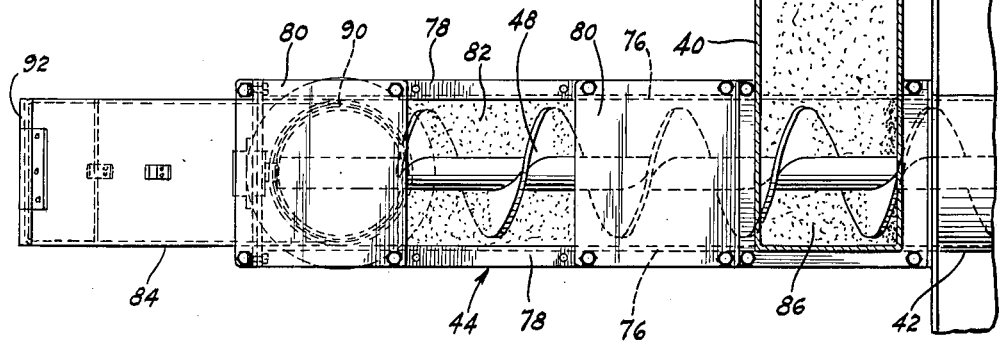
FIG. 4 is a horizontal sectional elevation of the structure shown in FIG. 3 as seen from the line 4—4 thereof.

The extension 44 preferably is substantially semi-cylindrical in the lower portion thereof so as to be complementary in shape to the exterior of the conductor auger 48 and relatively little space is provided therebetween, as is readily seen from FIGS. 2 and 3 especially. The sides 76 of the extension 44, however, preferably extend up in substantially parallel relationship to each other and vertically to edges somewhat above the uppermost surface of the conductor auger 48, as is best shown in FIG. 3. Said sides 76 terminate in horizontal flanges 78 for purposes of detachably receiving a plurality of cover plates 80. The entire top of the extension 44, preferably, is not covered by the plates 80, however, the object being to provide a space of desired size and location, such as exemplary space 82, comprising an air current exhaust through which foreign material, such as chaff, dirt, and the like, may be discharged upon separation thereof from the grain, indicated in exemplary manner in FIGS. 3 and 4 by stippling.

In accordance with the principles of the invention, and particularly that portion thereof relating to the cleaning of grain incidentally to elevating the same to the conductor means comprising tubular channel 42 and its extension 44, whereby relatively clean grain will be fed either into the grain bin 10 or delivered to discharge chute 84, air under substantial pressure is fed from the lower portion of the grain bin 10, as derived from the air pressure generating unit 22, for example, or other source, to the lower end of elevator housing 30. Particularly the central portion of housing 30, between the parallel reaches of the flexible belt or chain 32, comprises passage means through which an air column may rise and be discharged through the closed chute 40 in a substantially horizontal or somewhat downwardly extending direction, as can be visualized from FIG. 2. An air column moving through said passage means effectively permeates and traverses the falling grain as it is dumped successively from the scoops or buckets of the bucket conveyor 32 when they reach the upper portion of the elevator housing 30.

The falling grain passes through the closed chute 40 into the combined tubular channel 42 and extension 44 thereof, the grain then selectively is conducted either through the tubular channel 42 into the upper portion of the grain bin 10 when it is desired to load the bin 10, or to the extension 44 when unloading of the bin is to take place by discharge of grain through the discharge chute 84 at the outer end of extension 44. The grain conductor 48 is rotated in the correct direction to effect either loading or unloading of the bin. By referring particularly to FIG. 3, and assuming that the conductor auger 48 is rotating in a direction to feed the grain toward the right, as viewed in said figure, into the tubular channel 42, it will be seen that the channel 42 is substantially filled with grain, whereby the same is substantially blocked to the passage of air. Accordingly, the air which is discharged under considerable pressure from the upper end of elevator housing 30 and closed lateral chute 40 moves to the left, as viewed in FIG. 3, carrying with it any entrained dirt, chaff, and other foreign material for discharge through the exhaust space 42.

The distance traveled by said air which is entrained with foreign material preferably is relatively short, whereby there is little possibility of the air current dropping said entrained material while traversing said distance. However, the returning grain which is designated by direction arrows 86 in exemplary manner, is substantially heavier, at least per unit mass, than the particles of dirt, chaff, and the like, which is entrained by the air currents passing through said grain. Accordingly, the grain is not carried out of the exhaust space 82 by the discharging air current, but, rather, falls to the lower portion of extension 44 and is moved along the bottom surface of the extension, by the conductor auger 48, into bin 10.

Cleaning of grain by such air currents as are described above also is accomplished while unloading the bin 10, as when the conductor 48 is rotating in a direction to move the grain outwardly through extension channel 44 to the discharge chute 84. Under such circumstances, the grain will substantially fill channel extension 44, thus largely blocking the passage of any appreciable amount of air therethrough. However, the tubular channel 42 will be free of any substantial quantity of grain, whereby the air discharging from chute 40 and entraining dirt, chaff, and the like, will follow the path of least resistance which is outwardly through channel 42. The air current and undesired foreign material carried thereby will exit through the top opening 20 substantially, as indicated by arrows 87 in FIG. 1.

From the foregoing, it thus will be seen that simply by using sources of air pressure which are available in a grain bin provided with air-type drying means and having a grain elevator at one end, it is possible, merely by providing for appropriate air passageways and a suitable addition in the grain conveying channel means, such as extension 44, to obtain highly effective means capable of cleaning grain, incidentally to elevating the same, either to load or unload a grain bin, and with substantially no increase in cost to the operation of the grain bin, drying means and grain elevator.

It is to be understood, in connection with the desired arrangement of the position and size of the exhaust space 82, the cover plates 80 may be made any desirable length considered in the direction of the longitudinal dimension of the extension 44, and suitable bolt or screw holes are formed in the plates and the flanges 78 of the extension 44 in order that the desired number and arrangement of plates may be effected to dispose the exhaust space 82 where it is desired and of a desired area. The mere fact that the illustrated plates 80 are substantially the same size is not to be regarded as restrictive. For example, in regard to heavier grains, the exhaust space 82 may be arranged closer to the elevator housing 30 than when grains of lighter weight are being cleaned and elevated.

By referring particularly to FIG. 3, it will be seen that, in the preferred embodiment of the invention, the discharge chute 84 has at least a cylindrical vertical portion 88 which is connected by flange means 90 upon the conveyor extension 44 so as to be rotatable about a substantially vertical axis, whereby the outer end of the chute 84 may be moved to a number of different positions best suited for discharging grain into a truck or other conveyance into which the contents of the grain bin 10 are to be loaded. However, if it is found that discharge of the exhausting air current with entrained foreign material is not functioning as desired, the outer end of the discharge chute 84 may be provided with a suitable cover 92 which is maintained in closed condition by catch 94 when the grain cleaning operation is being performed, but when the conductor auger 48 is being rotated in a direction to discharge the grain from extension 44 as it is delivered thereto by the elevator, which direction of rotation is simply opposite that when the conductor auger is feeding grain into the bin 10, the cover 92 is held open by suitable means, such as snap catch 96.

It will be seen from the foregoing that, in addition to the present invention providing extremely simple, durable, and inexpensively operable grain cleaning means, said invention also provides equally simple, fool-proof, and inexpensively operable conducting means for the grain after it is elevated by the elevator from the lower portion of the bin to conveyor means comprising oppositely extending, but longitudinally aligned, channel 42 and its extension 44. Hence, when the grain is discharged into said conveyor means, simply by operating the manually movable shifting lever 68 of the drive-changing unit 62, the grain may be delivered to the bin or to the discharge chute 84, respectively to load and unload the bin, without requiring any shifting or rearranging of the conveyor extension 44 or the upper end of the elevator.

While the invention has been described and illustrated in its several preferred embodiments, it should be understood that the invention is not to be limited to the precise details herein illustrated and described since the same may be carried out in other ways falling within the scope of the invention as claimed.

I claim:

1. A grain bin having in combination therewith, a grain elevator at one end of said bin, means to actuate said elevator, substantially horizontal elongated channel means having portions extending in opposite directions directly from each other and from said grain elevator, one of said portions of said channel means extending along the upper portion of said bin and the other portion projecting outwardly from said elevator and said end of said bin for directed external discharge to unload said bin, said channel means communicating with and arranged to receive grain from said elevator, grain conducting means extending longitudinally along said channel means, and power means connected to said grain conducting means and reversibly operable selectively to move said grain conducting means in opposite directions respectively to conduct grain from said elevator to said bin and to discharge grain from the projecting end of said elongated channel means.

2. A grain bin and grain cleaner comprising in combination, a grain bin, a grain elevator at one end of said bin having passage means to permit a column of air to be blown up said passage, means to actuate said elevator, means to generate air under pressure and direct it up said passage means, substantially horizontal elongated channel means extending along the upper part of said grain bin to and projecting outwardly of said bin beyond said elevator, the projecting portion of said channel means having an exhaust opening therein, said channel means being arranged to receive grain from said elevator, a grain conductor extending longitudinally along said channel means and outwardly projecting portion thereof, and power means connected to said grain conductor and operable to move the same in a direction to feed grain from the upper end of said elevator and along said channel means and into said bin, said air pressure generating means being operable to direct a column of air under pressure up said elevator and through said outwardly projecting portion of said channel means for discharge through the exhaust opening therein to blow foreign material from said grain therethrough and thereby clean said grain before delivery thereof to said bin.

3. A grain bin and grain cleaner comprising in combination, a grain bin, a grain elevator at one end of said bin having passage means to permit a column of air to be blown up said passage, a bucket conveyor movable within said elevator, means to actuate said bucket conveyor, means to generate air under pressure and direct it up said passage means, substantially horizontal elongated channel means extending along the upper part of said grain bin to and projecting outwardly of said bin beyond said elevator, the projecting portion of said channel means having an exhaust opening therein and the upper end of said bucket conveyor being guided for discharge above said channel means, thereby dispersing the grain as discharged thereinto, grain conductor means extending longitudinally along said channel means and outwardly projecting portion thereof, and power means connected to said grain conductor and operable to move the same in a direction to feed grain discharged from said elevator along said channel means and into said bin, said air pressure generating means being operable to direct a column of air under pressure up said elevator for discharge through the dispersed grain as it falls into said channel means and thence moving through said outwardly projecting portion of said channel means for discharge through the exhaust opening therein to blow foreign material from said grain therethrough and thereby clean said grain before delivery thereof to said bin.

4. The grain bin and grain cleaner set forth in claim 3 further characterized by said bucket conveyor being supported and guided at the upper end thereof by a sprocket and said sprocket being above and laterally offset from said channel means, the brackets on said conveyor also being spaced apart sufficiently to permit ready passage of air currents therethrough.

5. The grain bin and grain cleaner set forth in claim 2 further including cover members for the top of the projecting portion of said channel means, and attaching means detachably connecting the cover member selectively to desired positions upon said channel means with certain of said members spaced apart, thereby to form an exhaust opening for the exit of air and entrained foreign material.

6. The grain bin and grain cleaner set forth in claim 5 further characterized by said grain conductor being close to the bottom of said channel means but spaced below said cover members, thereby to provide a space to permit the ready discharge of air through said exhaust opening.

7. The grain bin and grain cleaner set forth in claim 2 further including an open-ended discharge chute at the outer end of said outwardly projecting portion of said channel means, and cover means for the open end of said discharge chute movable between open and closed position, whereby the open end of said chute may be closed by said cover when air is being discharged through the exhaust opening in said projecting portion of said channel means to increase the effectiveness of removing foreign matter from said grain.

8. A grain cleaner comprising in combination, a grain bin, a substantially vertical grain elevator at one end of said bin having passage means to permit a column of air to be blown up said passage, means to actuate said elevator, means to generate air under pressure and direct it up said passage means, substantially horizontal elongated channel means extending in opposite directions from said grain elevator respectively along the upper part of said bin and projecting outwardly from the upper end of said grain elevator, said outwardly projecting portion having an exhaust opening in the upper portion thereof and a grain discharge spout adjacent the outer end thereof, said channel means being arranged to receive grain from the upper part of said elevator, an auger-type grain conductor extending longitudinally along said channel means, and power means connected to said grain conducting means and reversibly operable selectively to rotate said grain conducting means in opposite directions respectively to conduct grain from said elevator to said bin and to discharge grain from the spout on the projecting end of said elongated means, said air-pressure generating means being operable to direct a column of air under pressure up said elevator and through said projecting portion of said channel means for discharge through the exhaust opening therein to blow foreign material from said grain and thereby clean said grain before delivery thereof to said bin.

9. A grain cleaner comprising in combination, a grain bin, a substantially vertical grain elevator at one end of said bin having passage means to permit a column of air to be blown up said passage, means to actuate said elevator, means to generate air under pressure and direct it up said passage means, substantially horizontal elongated channel means extending in opposite directions from said grain elevator respectively along the upper part of said bin and projecting outwardly from the upper end of said grain elevator, said outwardly projecting portion having an exhaust opening in the upper portion thereof and an open-ended grain discharge spout adjacent the outer end thereof, said channel means being arranged to receive grain from the upper part of said elevator, an auger-type grain conductor extending longitudinally along said channel means, power means connected to said grain conducting means and reversibly operable selectively to rotate said grain conducting means in opposite directions respectively to conduct grain from said elevator to said bin and to discharge grain from the spout on the projecting end of said elongated means, said air pressure generating means being operable to direct a column of air under pressure up said elevator and through said projecting portion of said channel means for discharge through the exhaust opening therein to blow foreign material from said grain and thereby clean said grain before delivery thereof to said bin, and closure means for the open end of said discharge spout movable between open and closed positions, whereby said closure covers the open end of said spout when in closed position to increase the effectiveness of the cleaning of the grain by said column of air.

10. A grain bin and grain cleaner comprising in combination, a grain bin, a grain elevator at one end of said bin having passage means to permit a column of air to be blown up said passage, means to actuate said elevator, means to generate air under pressure and direct it up said passage means, substantially horizontal elongated channel means having a portion extending along the upper part of said grain bin and a portion projecting outwardly from said bin and beyond said elevator, said portions of said channel means respectively having exhaust openings therein, said channel means being arranged to receive grain from said elevator, an auger-type grain conductor extending longitudinally along said channel means into said respective portions thereof, power means connected to said grain conductor and operable selectively to rotate the same in opposite directions respectively to feed grain from said elevator along said portions of said channel means in said bin to load said bin and along said projecting portion of said channel means to unload said bin, said air pressure generating means being operable to direct a column of air under pressure up said elevator and through said portions of said channel means for discharge through the exhaust openings in said portions to blow foreign material from said grain and thereby clean said grain either before delivery thereof to said bin or from said bin, the foreign material being discharged through the exhaust opening of one portion of said channel means when grain is discharged through the other portion thereof and vice versa.

11. A grain bin and grain cleaner comprising in combination, a grain bin, a grain elevator at one end of said bin having passage means to permit a column of air to be blown up said passage, means to actuate said elevator, means to generate air under pressure and direct it up said passage means, substantially horizontal elongated channel means extending along the upper part of said grain bin to and projecting outwardly from said bin and beyond said elevator, the projecting portion of said channel means having an exhaust opening in the upper portion thereof, said channel means being arranged to receive grain from said elevator, an auger-type grain conductor extending longitudinally along said channel means and outwardly projecting portion thereof, and power means connected to said grain conductor and operable to rotate the same in a direction to feed grain from the upper end of said elevator and along said channel means and into said bin, said air pressure generating means being operable to direct a column of air under pressure up said elevator and through said projecting portion of said channel means for discharge through the exhaust opening therein to blow foreign material from said grain and thereby clean said grain before delivery thereof to said bin, the exhaust opening in said projecting portion of said channel means being spaced outwardly therein from the upper end of said elevator that any grain entrained initially in said discharging air stream will drop by gravity into said auger-type conductor and feed the same along said channel means to said bin.

12. A grain bin and grain cleaner comprising in combination, a grain bin, a grain elevator at one end of said bin having passage means to permit a column of air to be blown up said passage, means to actuate said elevator, means to generate air under pressure and direct it up said passage means, substantially horizontal elongated channel means having a portion extending along the upper part of said grain bin and a portion projecting outwardly from said bin and beyond said elevator, said channel means being arranged to receive grain from said elevator, an auger-type grain conductor extending longitudinally along said channel means into said respective portions thereof, power means connected to said grain conductor and operable selectively to rotate the same in opposite directions respectively to feed grain from said elevator along said portion of said channel means in said bin to load said bin and along said projecting portion of said channel means to unload said bin, said air pressure generating means being operable to direct a column of air under pressure up said elevator and selectively through said portions of said channel means for discharge therefrom to blow foreign material from said grain and thereby clean said grain either before delivery thereof to said bin or from said bin, the foreign material being discharged through one of said portions while grain is fed in an opposite direction through the other portion of said channel means and vice versa.

13. A grain bin having in combination therewith, an air compartment in said bin having air outlet opening means, means to generate a supply of air under pressure and deliver it to said compartment for circulation therefrom through grain in said bin, a grain elevator at one end of said bin, means to actuate said elevator, substantially horizontal elongated channel means having portions extending in opposite directions from the upper portion of said grain elevator respectively along the upper portion of said bin and projecting outwardly from said elevator and end of said bin for selectively feeding grain from the upper end of said elevator to said portion in said bin to load the same and to said projecting portion to unload said bin, grain conducting means extending longitudinally along said channel means, power means connected to said grain conducting means and reversibly operable selectively to move said grain conducting means in opposite directions respectively to conduct grain from said elevator to said bin and to discharge grain from the projecting end of said elongated means, and means communicating with said air generating means and operable to deliver a portion of the air generated thereby to the upper portion of said elevator to entrain foreign material and separate it from said grain to clean the same, said elevator being operable to move grain from the lower portion of said bin and transfer it to the channel means for delivery to the top of said bin, thereby effecting recirculation of the grain in said bin as much as desired to produce a predetermined degree of drying of said grain and coincidental cleaning thereof.

14. The grain bin set forth in claim 1 further characterized by said channel means being substantially continuous from end to end and the portions thereof projecting respectively in opposite directions from said elevator having discharge means adjacent the outer ends thereof, said grain conducting means comprising a continuous auger substantially coextensive in length with said channel means, and said auger intermediately of the ends thereof extending past said elevator, whereby said auger extends in opposite directions from said elevator.

References Cited in the file of this patent

UNITED STATES PATENTS

| | | |
|---|---|---|
| 626,108 | Stuckel | May 30, 1899 |
| 1,562,946 | Dowdall | Nov. 24, 1925 |
| 1,615,334 | MacGregor | Jan. 25, 1927 |
| 2,239,256 | Siren | Apr. 22, 1941 |
| 2,856,083 | Corrigan | Oct. 14, 1958 |